(12) United States Patent
Nieh

(10) Patent No.: US 7,571,092 B1
(45) Date of Patent: Aug. 4, 2009

(54) METHOD AND APPARATUS FOR ON-DEMAND LOCALIZATION OF FILES

(75) Inventor: Ko-Haw Nieh, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 802 days.

(21) Appl. No.: 11/193,169

(22) Filed: Jul. 29, 2005

(51) Int. Cl.
*G06F 17/20* (2006.01)
*G06F 17/28* (2006.01)
*G10L 11/00* (2006.01)

(52) U.S. Cl. .................. 704/2; 704/1; 704/3; 704/277
(58) Field of Classification Search .............. 704/2
See application file for complete search history.

(56) References Cited

U.S. PATENT DOCUMENTS

| 5,787,452 | A | 7/1998 | McKenna |
| 6,073,090 | A | 6/2000 | Fortune et al. |
| 6,623,529 | B1 * | 9/2003 | Lakritz ................... 715/205 |
| 6,757,688 | B1 | 6/2004 | Leapaldt et al. |
| 2002/0107684 | A1 * | 8/2002 | Gao ........................ 704/4 |
| 2003/0154071 | A1 * | 8/2003 | Shreve ...................... 704/9 |
| 2004/0190085 | A1 * | 9/2004 | Silverbrook et al. ........ 358/474 |
| 2004/0190092 | A1 * | 9/2004 | Silverbrook et al. ........ 358/539 |
| 2006/0100847 | A1 | 5/2006 | McEntee et al. |
| 2006/0100858 | A1 | 5/2006 | McEntee et al. |
| 2006/0116864 | A1 * | 6/2006 | McHugh et al. ............. 704/2 |
| 2006/0116865 | A1 * | 6/2006 | Cheng et al. ............... 704/2 |

\* cited by examiner

*Primary Examiner*—David R Hudspeth
*Assistant Examiner*—Justin W Rider
(74) *Attorney, Agent, or Firm*—Robert C. Kowert; Meyertons, Hood, Kivlin, Kowert & Goetzel, P.C.

(57) ABSTRACT

Method and apparatus for the on-demand localization of files. Embodiments may provide a file format-independent localization mechanism that automates the extraction of localizable text content from localizable files, the process of generating translations for the extracted localizable text content, and the generation of localized versions of the localizable files including the translations for the extracted localizable content. The localized versions of the files may be automatically generated with correct structure and content, correct file names, and automatically placed in correct file locations by the localization mechanism, and are thus readily available to and locatable by an automated build process for the localized version of the product, thus reducing or eliminating the necessity for human intervention during the localization process.

20 Claims, 6 Drawing Sheets

METHOD AND APPARATUS FOR ON-DEMAND LOCALIZATION OF FILES

BACKGROUND OF THE INVENTION

1. Field of the Invention

This invention relates to computer systems, and more particularly to the localization of computer software products.

2. Description of the Related Art

The globalization of a software product involves the identification of localizable files of the software product that require custom localization for a particular language or languages. The localizable files may include a portion of or all of the files that are associated with the product. Text content of these localizable files must be translated into target languages via a localization process. Other elements may need to be localized as well. The localized files then must be included with, plugged into or built into a localized version of the software product.

Often, these localizable files include files of different file formats. Exemplary file formats may include, but are not limited to, markup language file formats (e.g., HTML and XML), Java® Server Pages (JSP), programming language source code files, Property files, JPG files, custom Message files, resource files, etc. In addition to other content, these files may include localizable content that needs to be translated. In conventional localization mechanisms, it is difficult to separate localizable content out of the localizable files, and is equally difficult to merge the translations of the localizable content back into the files while maintaining the integrity of the file structure. For example, when localizing a product that uses JSP files, it is essential to extract localizable content out of a JSP file, have the extracted content translated, and merge the translations back into the JSP file without breaking the tags and the format integrity of the JSP file. Similar difficulties exist in localizing HTML, XML, and other file formats as well.

There are two conventional approaches to a localization process for translating localizable elements in files. The first approach is to request language translators to translate the localizable files manually. The second approach is to use computer programs to automate (a portion of) the translation process. In the first approach, language translators conventionally require translation guides to guide them on how to translate each file while preserving the integrity of the format. Even so, the translation process is subject to human error. In addition, writing an effective translation guide is a non-trivial task. Translation guides for files of various file formats may be misunderstood by language translators that may not have the necessary technical background. This has been an error-prone approach as often the wrong strings are localized and/or tags or other elements of the file format that is not to be translated is damaged or deleted from the file, hence losing the structure of the file, and requiring human effort to fix and test the files.

In the second approach, special computer programs have been written to at least partially process different formats of localizable files. These conventional programs typically include mechanisms to programmatically parse the files according to the file format in an attempt to locate and extract localizable content. However, these conventional programs do not have the ability to process/parse all file formats, and require additional and custom programming effort to add support for new file formats or to change the processing of existing file formats, if the file formats are modified. Further, conventional localization programs tend to be error-prone and thus often are not guaranteed to extract localizable elements from the files perfectly. Typically, the parsed-out content may then be sent to human translators for translation.

Because of the above problems in the two conventional approaches, localization engineers typically must carefully scrutinize and test all translated files before bundling the files into the software product being localized. This tends to be a time-consuming and error-prone process. Additional testing may be required to verify the localized content in the localized product. In addition, localizing the software product to each of one or more additional languages typically requires as much effort for each additional language as did localizing the product to a first language. The localization effort put into localizing a product for one language cannot easily be leveraged across additional languages. In addition, the localization effort put into localizing one product cannot easily be leveraged to localize another product.

In conventional approaches to localization, when a product is to be localized, the localizable files or extracted localizable content are gathered from the product development team and sent to human translators. When the files are sent for translation, the development team may still be modifying the original files. Human translation of the files may take days or weeks. By the time the translated files are received back from the translators, the files may be obsolete. In some cases, to deal with this, the product development team may be given a "freeze" date; after that date, the team cannot change any files that require localization so that there is time in the project to translate. Thus, the noted problems in conventional product localization methods may cause costly delays in the product development process.

SUMMARY

Embodiments of a method and apparatus for the on-demand localization of files are described. Embodiments may provide a localization mechanism that automates the extraction of localizable text content from localizable files, the process of generating translations for the extracted localizable text content, and the generation of localized versions of the localizable files including the translations for the extracted localizable content. The localization mechanism may be file format-independent, and thus may allow the processing of different file formats of localizable files. The localized versions of the files may be automatically generated with correct structure and content, correct file names and automatically placed in correct file locations by the localization mechanism, and are thus readily available to and locatable by an automated build process for the localized version of the product.

Automation of the overall localization process using embodiments of the localization mechanism may reduce or eliminate human-caused errors when compared to conventional localization processes, which typically rely on human intervention at the various stages of the process. The localizable files are processed by the automated localization mechanism, which generates correct localized versions of the files, requiring little or no human intervention to modify, move, or rename the localizable or localized files. Thus, since the automated localization mechanism removes the necessity for human manipulation of the localizable and localized files, the structure of the localizable files cannot be incidentally damaged by human manipulation when generating localized versions of the files during the localization process.

In one embodiment, the localization mechanism generates translation kits formatted according to a canonical translation kit format, hence reducing or eliminating errors generated during the translation of localizable text content by human translators. The generated translation kits may be handed off to the translators for translation of the localizable text content in the translation kits. The localization mechanism may then automatically merge the translated text content generated from the translation kits into localized versions of the files while preserving the original file structure of the files. Embodiments of the localization mechanism may reduce or eliminate the need to write translation guides for language translators, as the localization mechanism generates the translation kits in a canonical format for translators regardless of the file format being processed.

In one embodiment, the localization mechanism may receive localizable files and extract the localizable text content from the localizable files. An iteration of a localization process may be initiated in which the localization mechanism searches a localization database to locate translations for the extracted localizable text content and automatically generates translation kits and localized versions of the localizable files. The generated translation kits may include localizable text content from the localizable files for which translations were not found in the translation database. If the translation kits are not empty after all the localizable text content has been processed against the localization database to locate translations, the translation kits may be provided to one or more translators that provide translations for the localizable text content in the translation kits. The translations in the translated translation kits may then be imported into the localization database, and the imported translations applied to the localizable content on a subsequent iteration of the localization process. If the translation kits are empty after all the localizable text content has been processed against the localization database to locate translations, the localization process for the localizable files is complete.

Embodiments of the localization mechanism may allow the localization process to be more scalable when compared to conventional localization methods, as the translation of the localizable files into additional languages may require little or no additional engineering effort. Through iterations of the localization process performed by embodiments of the localization mechanism, the localization database accumulates additional translated data. Thus, the localization database "learns" additional translations for strings over time and may be leveraged in localizing additional files related to other projects or products to be localized.

Figure 1:
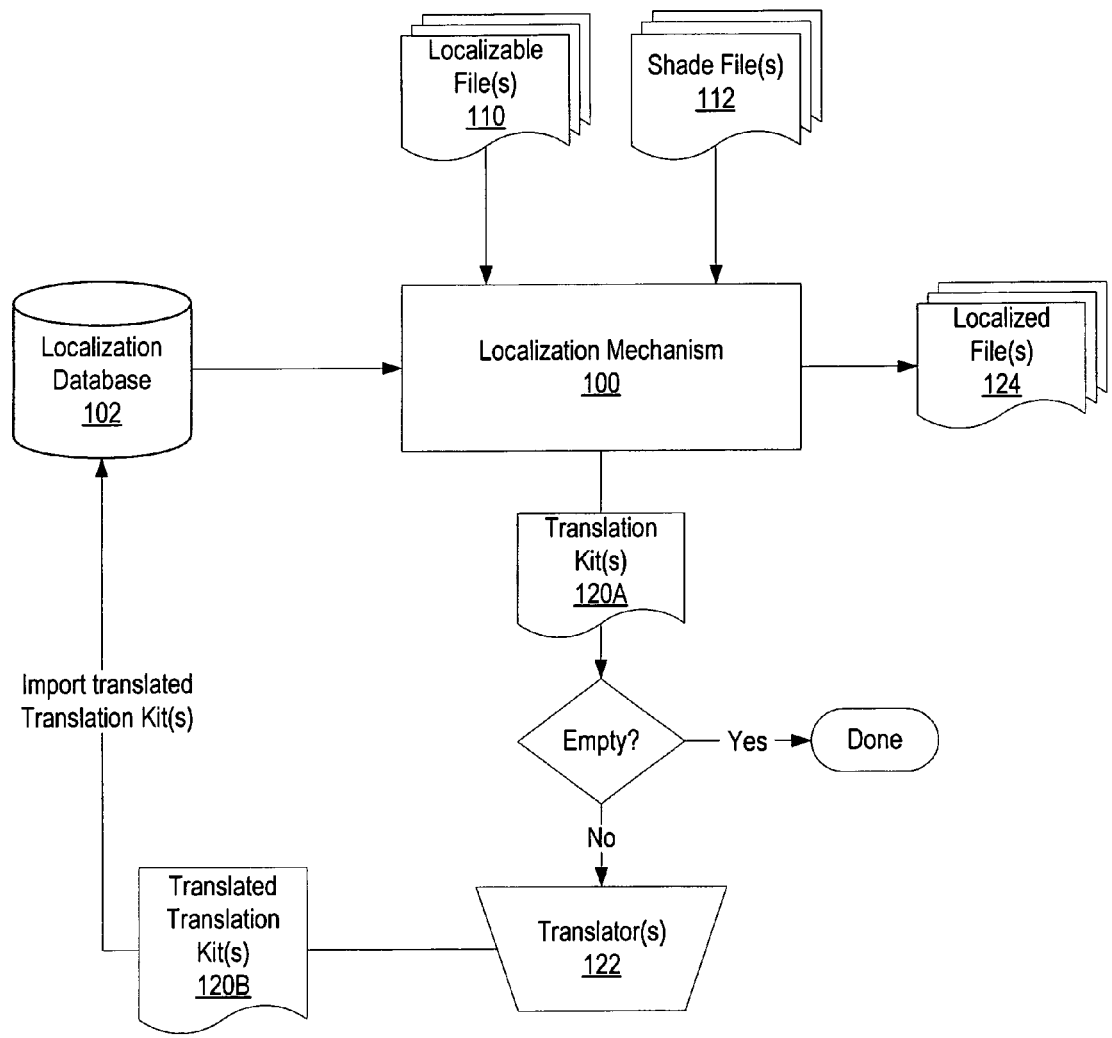
FIG. 1 illustrates the workflow of a localization process according to one embodiment of the localization mechanism.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a method and apparatus for the on-demand localization of files are described. Embodiments may provide a localization mechanism that automates the extraction of localizable text content from multiple file formats such as markup language formats (e.g., HTML and XML formats), JSP (Java® Server Page) format, etc, and that generates translation handoffs (referred to herein as translation kits) formatted according to a canonical, user-friendly translation kit format, hence reducing or eliminating errors in the translation process that are common in conventional localization methods. The generated translation kits may be handed off to translators for translation of the localizable text content in the translation kits. The localization mechanism may also automatically merge the translated text content generated from the translation kits into localized versions of the files while preserving the original file structure of the files.

Embodiments of the localization mechanism may be configured to process any format of files to generate translation kits in the canonical translation kit format. The localization mechanism may be file format-independent, and thus may allow the processing of different file formats (e.g., HTML, XML, JSP, Property files, Message files, etc.) of localizable files. For at least some file formats, the localization mechanism may be configured to use shade files to extract localizable content from the files. Shade files are further described below. Note that some file formats may not require the use of shade files; for these file formats, the localizable content may be directly extracted from the file and reformatted into the canonical translation kit format.

Embodiments of the localization mechanism may, during the localization process:
  isolate the localizable content from the files to be localized;
  match equivalent translations from a localization database;
  generate a simple, consistent handoff (translation kits) for translators regardless of the original file format;
  update the localization database with the translations received from the translators; and
  merge the translations received from the translators and the original localizable files while preserving the file structure of the files.

Note that the localization process may be iterative, and thus may be repeated one or more times for a set of localizable files. In one embodiment, the localization process may be repeated until the generated translation kits are "empty"; i.e., until the translation kits generated by the localization mechanism include no localizable text content to be translated. (Note that this indicates that translations for all strings that are to be translated have been located in the localization database accessed by the localization mechanism).

Embodiments of the localization mechanism may reduce or eliminate the need to write translation guides for language translators, as the localization mechanism may generate the translation kits in a canonical format for translators regardless of the file format being processed. The canonical format of the translation kits may help to reduce or eliminate errors generated during the translation process when compared to conventional translation methods. A reason for this reduction in human errors is that the localizable files are not provided to the translators, as is typically done in conventional translation methods; instead, translation kits in a canonical format are provided to the translators. In addition, the automated operation of the localization mechanism may help to reduce or eliminate the possibility of human errors in the localization process. The localizable files are processed by the automated localization mechanism, which generates correct localized versions of the files, requiring no human intervention or modification of the localizable or localized files. Thus, since the automated localization mechanism removes the necessity for human manipulation of the localizable and localized files, the structure of the localizable files cannot be incidentally damaged by human manipulation, for example using an editor program, when generating localized versions of the files during the localization process. The localized files will be identical in structure to the localizable files for which they are generated, with the only difference that the localizable text content is replaced with corresponding translations. In addition, the localized versions of the files may be automatically generated with correct file names and automatically placed in correct file locations by the localization mechanism, and are thus readily available and locatable by an automated build process for the localized version of the product.

The canonical format of the translation kits provides one common format for the localizable text content of all files of any format to be translated by the translators, and thus simplifies the recognition of text to be translated and the insertion of translations into the translation kits when compared to the task of recognizing translatable text and inserting translations into files of various formats as is typically required in conventional localization methods. Embodiments of the localization mechanism may also make the localization process more scalable when compared to conventional localization methods, as the translation of the localizable files into additional languages may require little or no additional engineering effort. Embodiments may also provide the ability to port localized portions of products to new platforms with little or no additional localization engineering effort.

Note that, in conventional localization methods, the translators are typically handed software files in formats such as markup language formats (e.g., XML and HTML), JSP, Java® source code, etc., which are subject to being structurally damaged by the translators (who may not be proficient with the file formats) during the translation process. In these conventional localization methods, localization engineers generally examine all translated files to ensure proper translation and that the structure of the files has not been damaged during the translation process. This post-translation examination may be a time-consuming and error-prone process. Embodiments of the automated localization mechanism may reduce or eliminate the need for localization engineers to examine the translated files. Also note that the potential for structural damage to the localizable files during conventional localization methods may require additional software testing overhead to verify the translated files. Using embodiments of the localization mechanism as described herein, the localizable files in their original formats are only handled by the automated localization mechanism, reducing or eliminating the chance that the structure of the files will be damaged, and thus reducing or eliminating the need for post-translation human examination of the files and also reducing or eliminating post-translation testing overhead.

Through iterations of the localization process performed by embodiments of the localization mechanism, the localization database accumulates additional translated data. Thus, the localization database "learns" additional translations for strings over time and, through this learning, the localization database may be leveraged in localizing additional files related to other projects or products to be localized. In general, the more the localization database "learns", the less effort may be required to localize another product. In other words, as the localization database learns more translations, the translation kits may tend towards containing fewer and fewer strings to be translated. Thus, over time, embodiments of the localization mechanism may lower the cost in time and money of localizing new products and/or of updating the localized versions of updated products by requiring less reliance on human translators, which may save both time and money during the localization process.

In one embodiment, the localization database may be a relational database. Note, however, that other types of databases may be used in other embodiments. The localization database may be leveraged to provide and maintain consistent translations of localizable text content across all products to be localized. Translations generated during the localization of one product and stored in the localization database may be leveraged to localize other products. In one embodiment, a user interface and/or API may be provided that allows the performance of regular expression searches on all translations in the localization database. New translations, translation improvements, and localization "bug fixes" may be retained in the localization database. In one embodiment, a user interface and/or API may be provided that may be used to generate accurate string counts, word counts, and other statistics and reports from the localization database.

FIG. 1 illustrates the workflow of a localization process according to one embodiment of the localization mechanism. Note that the localization process may be iterative. Inputs to an iteration of the localization process performed using the localization mechanism may include, but are not limited to:

Localizable files 110;

Shade files 112 for the localizable files 110 (if necessary); and

Localization database 102.

Outputs from an iteration of the localization process performed using the localization mechanism may include, but are not limited to:

Localized files 124; and

Translation kits 120A in a canonical format.

Translation kits 120A contain strings (words, phrases, sentences, paragraphs, etc.) for which translations cannot be found in the localization database 102. Translation kits 120A may be provided to language translators 122 for translation, generating translated translation kits 120B. Note that it is not necessary to provide the localizable files 110, shade files 112, and localized files 124 to translators 122. The translators may only be provided with the translation kits 120A. Also note that the translation kits 120A are canonical, and as such are of the same basic structure/format across files, products and even languages. Thus, once a translator has handled one translation kit 120A, the translator is familiar with the format/structure of any future translation kits. The translated translation kits 120B may then be imported into the localization database 102. The canonical format of the translation kits 120A may be maintained by the translators 122 during the translation process, which simplifies the importation of the translated translation kits 120B into localization database 102.

Note that localized files 124 may be incomplete localizations of the localizable files 110 on first and subsequent iterations of the localization process. The localized files 124 may only be considered "complete" when there are no strings in the translation kits 120A generated by the localization mechanism. Also, note that the receipt and importation of translated translation kits 120B, as well as other events, may generate an iteration of the localization mechanism, which generates updated versions of the localized files 124 (and new translation kits 120A, which may or may not contain strings to be translated).

An iteration of the localization process may be triggered by one or more of the following events, or in some embodiments by other events:
- updates of localizable files 110 and/or shade files 112;
- an import of translated translation kit(s) 120B received from translators 122;
- error correction or other modification of the localization database through human interaction using a user interface to the localization database;
- triggering of an iteration according to a periodic or aperiodic schedule; or
- manual triggering of an iteration through user interaction with a user interface to the localization mechanism.

In one embodiment, the localization process may be completed when there are no new strings in the translation kits 120A and all of the localizable content in the localizable files 110 is replaced with translated content from localization database 102 by localization mechanism 100, generating "completed" localized files 124. When completed, the localized files 124 may, for example, be used to provide a localized version of a system, product, application, utility, service, Web site, or any other software product for which the localization process is performed. Note, however, that updates to the localizable files 110 and/or shade files 112 may trigger addition iteration(s) of the localization process, generating new translation kits 120A (which may or may not be empty), updated version(s) of the localized files 124, and possibly imports of newly-translated strings to the localization database 102.

Embodiments of the localization mechanism may enable the on-demand generation of a localized version of a product. Embodiments may generate localized files 124, and translation kits 120A in a canonical format, from localizable files 110 in a variety of formats in an iterative localization process; this localization process may be repeated one or more times until there are no strings in the generated translation kits 120A to be translated. Translated translation kits 120B from one iteration may be imported into the localization database 102 and used as input to the localization mechanism 100 in generating localized files 124 and translation kits 120A in a subsequent iteration.

As embodiments of the localization mechanism provide automated handling of localizable files 110 in multiple formats, the automatically-generated localized files 124 may be placed at correct locations (e.g., in correct directories), may be given correct file names, and, since the localization process is more automated than conventional methods and therefore more free from human error, may have correct content with a higher degree of certainty than provided by conventional methods. Since the localization process is automated and generates correct files with correct names, structure, and content in correct locations, there is little or no need for human intervention in naming or placing of the localized files 124, or for verification, editing, and testing of the generated localized files 124 to insure correct structure and content. Thus, the generated localized files 124 are "ready" to be built into the localized version of the product for which the files have been localized when generated by an iteration of the localization process. The only place in the localization process where human intervention may be necessary is in the translation process performed by the translators, and in that case the translation kits 120A and not the localizable files themselves are manipulated by humans. The content of the translated translation kits 120B returned from the translators 122 is then imported into the localization database 102. The automated localization mechanism 100 then handles the generation of the localized files 124 from the updated localization database 102. The canonical format of the translation kits 120A helps to reduce or eliminate human-introduced errors, and may also reduce the turnaround time (and cost) for translating the content of the localizable files 110.

Note that, while the above describes the localized files 124 as being updated by the localization mechanism 100 on each iteration of the localization process, in one embodiment the translated text content may not be written into the localized files 124 until the localization process has completed; that is, until an iteration of the localization process generates empty translation kits 120A.

Figure 2:
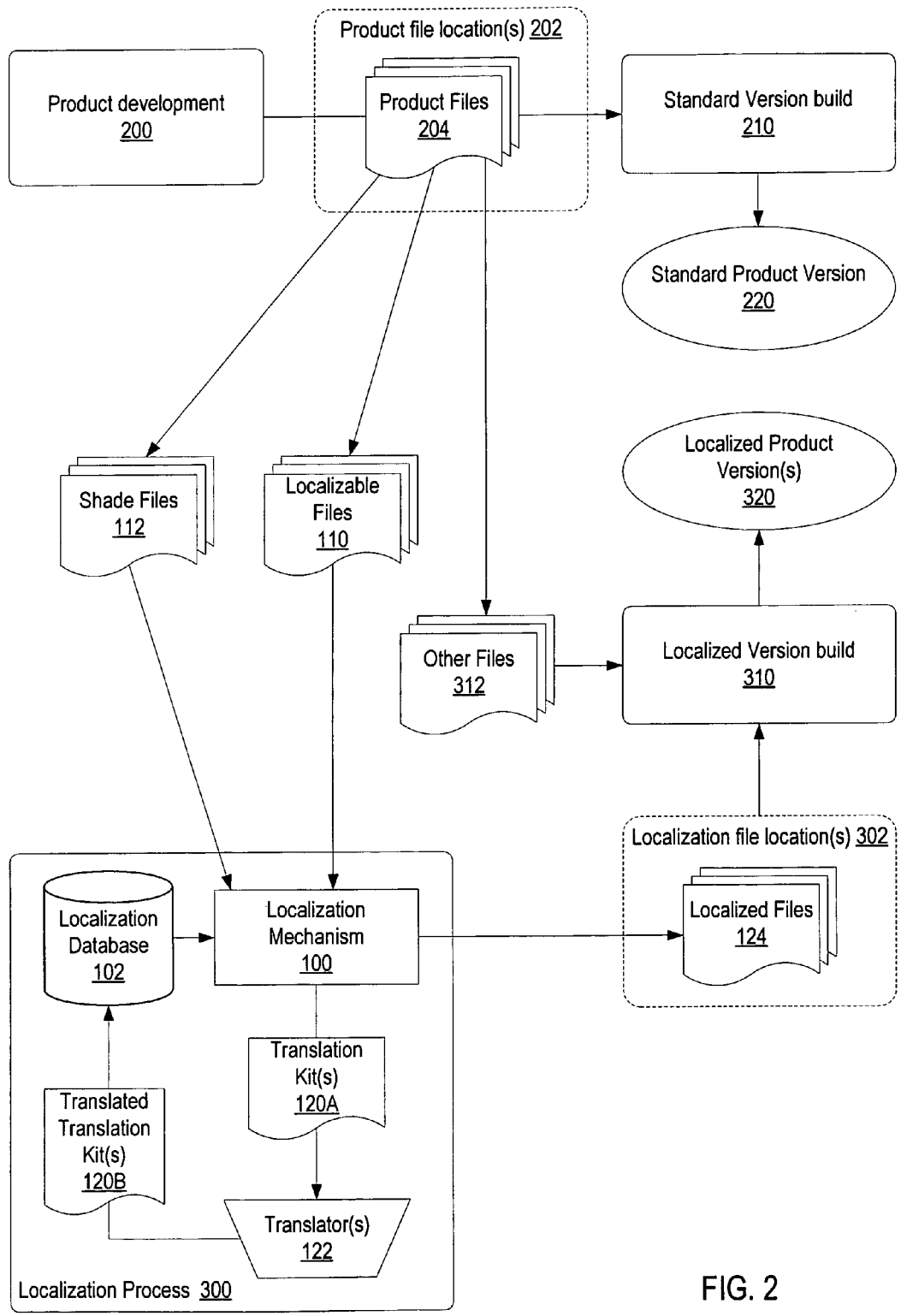
FIG. 2 illustrates an exemplary overall product development process that generates a "standard" version of a product and one or more localized versions of the product in accordance with an embodiment of the localization mechanism.

FIG. 2 illustrates an exemplary overall product development process that generates a "standard" version of a product and one or more localized versions of the product in accordance with an embodiment of the localization mechanism as described herein. Product development 200 may generate and/or modify product files 204. Product files 204 may include any format or type of files that may be used in building the particular product. The types of product files 204 may vary from product to product. Exemplary file types/formats may include one or more of, but are not limited to: Java® source code files (or source files in any other programming language, such as C/C++), HTML files, XML files, JSP files, Property files, Message files, Help files, etc.

Product files 204 generally include one or more of what may be referred to as "source code files" which include source code in one or more of any programming language. Source code files may be used, for example, in the generation of the software module(s) of the product during the Product Version Build process. Product files 204 generally also include one or more of what may be referred to as "data files." Data files may be used during the Product Version Build process in generating the software modules and/or may be included as part of a Product Version "package" that is generated by the Product Version Build process. Note that "package" is used herein to refer to the set of files that are included in a Product Version. Some data files, such as Property files and Message files, may be configured to be accessed to obtain data included in the files during execution of the software module(s) of a generated Product Version. Other data files may serve other purposes.

One or more of the product files 204 generated by product development 200 may include text content that is intended for visual (and, in some cases, audible) display to user(s) during execution of a generated Product Version. Examples of such text content may include one or more of, but are not limited to: text content of a Web page, user interface element text (e.g., the text items in a menu user interface element, the text label on a button or other user interface element, etc), error or other message text, "Help" text, text elements in a Property display, etc. One familiar with the art will recognize that there are many other examples of the use of such text content across the range of software products.

Typically, the text content in the one or more product files 204 will be originally generated in accordance with a particular language during product development 200. Perhaps the most typical language used for the original text content is the English language, but note that the original text content of product files 204 may be generated in any other language. It is this text content in the original language that may need to be translated into a different language or languages to generate localized version(s) of the product. The product files 204 that include text content that needs to be translated are what are referred to herein as localizable files 110. Note that localizable files 110 may encompass all of product files 204 or a subset of product files 204. For example, localizable files 110 may include text content in the English language, and it may be necessary or desirable to translate the text content into one or more other languages such as French, Spanish, German, Mandarin Chinese, Japanese, etc. so that localized versions of the product for those one or more other languages may be built.

Product files 204 are typically stored in specific product file locations 202 that are known to the Standard Version build 210 process. For example, the product files may be stored in one or more directories or folders, or in a hierarchy of directories/folders, in accordance with a file system on a storage device, and in accordance with a file organization scheme for the product under development. In other words, the product files 204 may be organized so that particular files are stored in particular specified locations (product file locations 202).

During an automated Standard Version build 210, the product files 204 may be accessed from the product file locations 202 to generate Standard Product version 220. Standard Product version 220 may be the version of the product that is generated for the primary target language for which the product was developed. For example, if localizable files 110 include text content in the English language, Standard Product version 220 may be the "English Language Version" of the product.

Localizable files 110 may be input to an embodiment of the automated localization mechanism 100 as described herein. Some of the localizable files 110 may be of a format that is difficult to parse directly, and therefore shade files 112 for these localizable files may be input to localization mechanism 100 and used by localization mechanism 100 to extract text content from the corresponding localizable files 100. Examples of file formats that may be difficult to parse to extract text content and thus for which shade files 112 may be used may include, but are not limited to, HTML, XML, JSP, and programming language source code files in general. Others of the localization files 110 may be of a format that is easy to parse, and thus may be parsed directly by localization mechanism 100 to extract localizable text content without using shade files 112. Examples of file formats that may be relatively easy to parse and thus for which shade files 112 may not be necessary include, but are not limited to, Message files and Property files. Note, however, that shade files 112 could be used for files of these formats to extract localizable text content as well.

In one embodiment, shade files 112 may be used by localization mechanism 100 to programmatically mask out all localizable text content (which may also be referred to as strings) from the localizable files 100. The shade files 112 may be viewed as a type of "template" file. In one embodiment, the shade files 112 may be otherwise identical to the localizable files 110, but with the localizable text content removed. In other words, the shade files include the structure (HTML code, XML code, JSP statements, Java® source code, etc) of the localizable files 110, but do not include the localizable text content of the localizable files. In one embodiment, a shade file 112 for a localizable file 110 may be easily generated by deleting the localizable strings from the localizable file 110 (generating a new file, the shade file 112). In one embodiment, extra lines, such as meta tags, may be added to the shade files 112 if necessary or desired.

Localization mechanism 100 may programmatically mask a localizable file 110 with its associated shade file 112 to extract the localizable text content from the localizable file 110. Note that the localization mechanism does not need to be familiar with a particular file format to mask a file of that format with its corresponding shade file 112; thus, shade files 112 may be used by localization mechanism to extract the localizable text content from files of any file format. Also note that, in one embodiment, shade files 112 may, but do not necessarily, have the same or similar names as their associated localizable files 110, but may have a different file extension or other file type identifier. Also note that, if the product is to be localized into two or more different languages, the same shade files 112 may be used in the localization process to extract the localizable text content from the localizable files 110 for each language.

After extracting localizable text content from a localizable file 110 by masking the localizable file 110 with its associated shade file 112, localization mechanism 100 may programmatically search localization database 102 to try to find translation matches for each extracted localizable string from the localizable file 110. If a match is found in localization database 102 for a particular localizable string, the located string translation may be written into a localized file 124 version of the localizable file 110 at the location from which the localizable string was extracted. In one embodiment, the associated shade file 112 may be used as a template to create the "blank" localized file 124 into which string translations are written. In another embodiment, localized files 124 may be generated as copies of localizable files 110, and the original localizable strings in the localized files 124 may be replaced with the located string translations in the file.

Note that localization mechanism 100 does not have to be familiar with the particular file format of a localized file 124 into which it writes translated content. In one embodiment, localization mechanism 100, when extracting localizable text content from a localizable file 110, may record a location in the file from which a particular localizable string is extracted. This location may then be used to write the localized string into the localized file 124.

If a match is not found in localization database 102 for a particular localizable string, the localizable string may be written to a translation kit 120A. In one embodiment, other information including, but not limited to, the file name of the localizable file 110 from which the localizable string was extracted and the location in the localization file 110 of the localizable string, may also be written into the translation kit 120A. After all localizable files 110 have been so processed by localization mechanism 100, one or more translation kits 120A may have been generated, as well as the localized files 124. If the translation kit(s) 120A are empty, then the localization process for the product is complete. Otherwise, the translation kit(s) 120A are provided to Translator(s) 122. Translators 122 then translate the localizable strings in the translation kit(s) 120A, and the string translations produced by the translators 122 are entered into the translation kit(s) 120A to generate translated translation kit(s) 120B. Translators 122 then return the translated translation kit(s) 120B, and the string translations from the translated translation kit(s) 120B are imported into localization database 102. In one embodiment, other information from the translated translation kit(s) 120B including, but not limited to, the file names of the localizable files 110 from which the localizable strings were extracted and the location in the localization files 110 of the localizable strings (and thus for the string translations), may also be imported from the translated translation kit(s) 120B into the localization database 102. Importation of the string translations from the translated translation kit(s) 120B into localization database 102 may trigger another iteration of the localization process 300, in which localization mechanism 100 may generate new versions of localized files 124 and translation kit(s) 120A. Iterations of the localization process 300 may continue until translation kit(s) 120A are empty, at which time localized files 124 are complete.

Note that updates to localizable files 110 and/or shade files 112, for example by product development 200, may again trigger the localization process 300, again generating new versions of localized files 124 and translation kit(s) 120A and one or more iterations of localization process 300 until translation kit(s) 120A are empty (and localized files 124 are complete).

Note that, while the above describes the localized files 124 as being updated by the localization mechanism 100 on each iteration of the localization process, in one embodiment the translated text content may not be written into the localized files 124 until the localization process has completed; that is, until an iteration of the localization process generates empty translation kits 120A.

As mentioned above, product files 204 are typically stored in specific product file locations 202. In addition, localized files 124 may be automatically stored by localization mechanism 100 in specific locations (localization file location(s) 302). For example, the localized files 124 may be stored in one or more directories or folders, or in a hierarchy of directories/folders, in accordance with a file system on a storage device, and in accordance with an organization scheme for the product under development. In other words, the localized files 124 may be organized so that particular files are stored in particular specified locations (localization file location(s) 302).

After the localization process 300 is complete, a Localized Product Version 320 may be built (note that it is possible to build a Localized Product Version 320 before the localization process 300 is complete). During an automated Localized Version build 310, the localized files 124 may be accessed from the localization file location(s) 302 to generate Localized Product version 320. Note that localized files 124 may not require any human modification to be used in the Localized Version build 310; performance of the localization process using an embodiment of the automated localization mechanism 100 generates complete and correct localized files 124, and automatically places the localized files 124 in the correct location(s) for access by the Localized Version build 310.

In addition, other project files 312 (project files, if any, that do not require localization) may be accessed during the Localized Version build 310. Other files 312 may be accessed from product file locations 202, as described above for the Standard Version build 210. Alternatively, these other files 312 may be copied into localization file location(s) 302. Localized Product version 320 may be the version of the product that is generated for the target language for which the product is being localized. For example, Localized Product version 320 may be the Spanish, French, German, Japanese, Mandarin Chinese, etc. of the product.

The localization process 300 described above may be performed for one or for multiple languages. Exemplary languages may include one or more of, but are not limited to, Spanish, French, German, Japanese, and Mandarin Chinese. Note that the localization process 300 using the automated localization mechanism 100 as described herein may be performed to localize a product developed in any language into any other language. If there are multiple languages for which a product is to be localized, localization process 300 may be performed separately to localize the product for each particular language, or alternatively may localize the product for two or more languages essentially simultaneously.

Note that other products under development may leverage the localization database 102 to localize the products. In other words, text content translations generated during the localization process 300 and imported into localization database 102 for one product may be used to match strings during the localization process 300 for another product, and vice versa. For a developer that develops (or updates) multiple products over time, the localization database 102 may tend to "learn" string translations over time that can be leveraged in additional product localizations, thus reducing the time and cost involved in the localization process 300.

Figure 3:
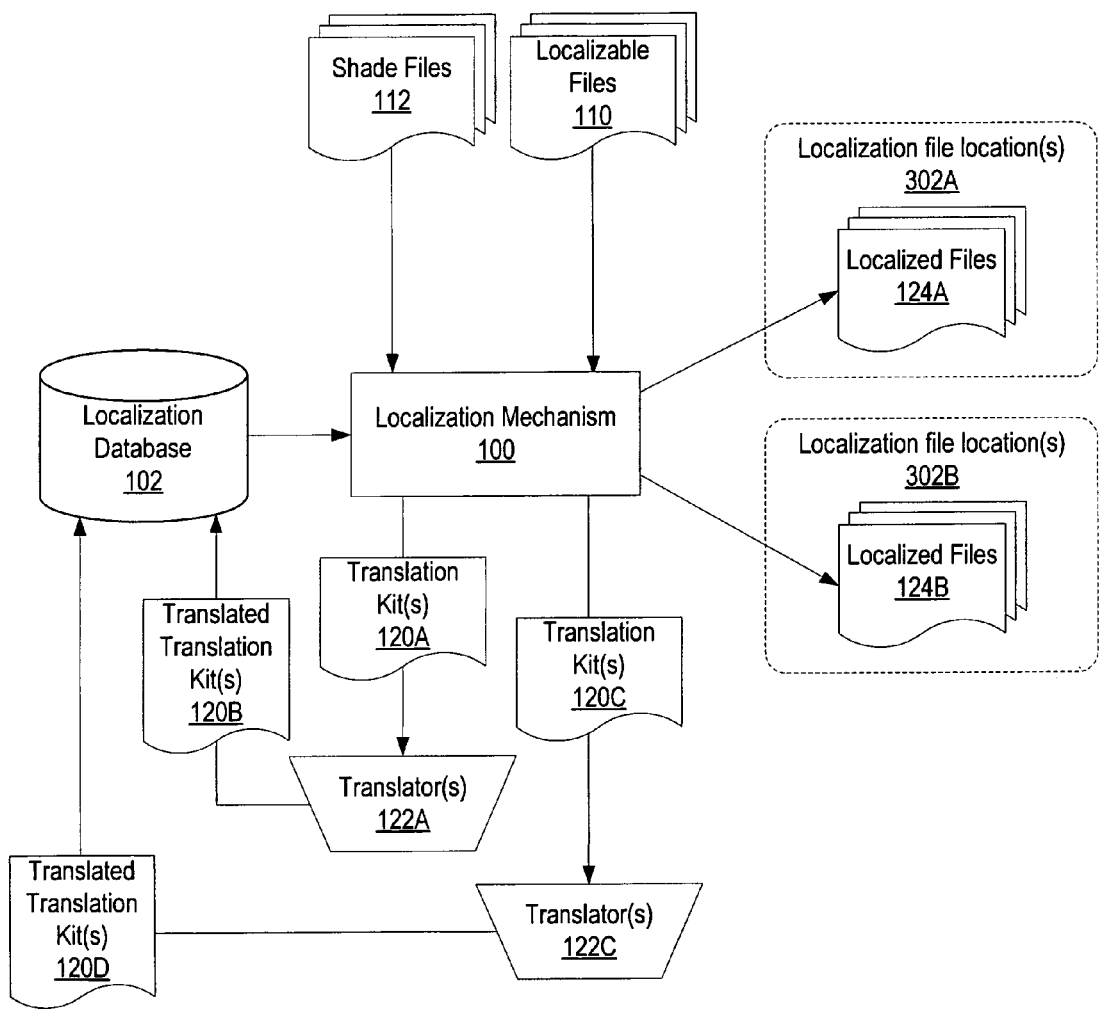
FIG. 3 illustrates a localization process generating two localized versions of the product for two different languages in accordance with an embodiment of the localization mechanism.

FIG. 3 illustrates a localization process generating two localized versions of the product for two different languages in accordance with an embodiment of the localization mechanism as described herein. The two languages may be referred to as language A and language B. In this example, generation or modification of localization files 110 and shade files 112 may trigger the localization process for the two languages. Localizable files 110 may be input to an embodiment of the automated localization mechanism 100 as described herein. Some of the localizable files 110 may be of a format that is difficult to parse directly, and therefore shade files 112 for these localizable files may be input to localization mechanism 100 and used by localization mechanism 100 to extract text content from the corresponding localizable files 100. Others of the localization files 110 may be of a format that is easy to parse, and thus may be parsed directly by localization mechanism 100 to extract localizable text content without using shade files 112.

After extracting localizable text content from a localizable file 110 by masking the localizable file 110 with its associated shade file 112, localization mechanism 100 may programmatically search localization database 102 to try to find translation matches according to the two languages (language A and language B) for each extracted localizable string from the localizable file 110. In this embodiment, localization database 102 may include string translations for multiple languages, specifically for the two exemplary languages (language A and language B) for which the product is being localized. If a match in language A is found in localization database 102 for a particular localizable string, the located string translation may be written into a localized file 124A version of the localizable file 110 at the location from which the localizable string was extracted. If a match in language B is found in localization database 102 for a particular localizable string, the located string translation may be written into a localized file 124B version of the localizable file 110 at the location from which the localizable string was extracted.

If a match is not found for a particular localizable string in localization database 102 for language A, the localizable string may be written to a translation kit 120A. If a match is not found for a particular localizable string in localization database 102 for language B, the localizable string may be written to a translation kit 120C. After all localizable files 110 have been so processed by localization mechanism 100, one or more translation kits 120A and one or more translation kits 120C may have been generated, as well as the localized files 124A and 124B.

If the translation kit(s) 120A are empty, then the localization process into language A for the product is complete. Otherwise, the translation kit(s) 120A are provided to Translator(s) 122A. Translators 122A then translate the localizable strings in the translation kit(s) 120A, and the string translations produced by the translators 122A are entered into the translation kit(s) 120A to generate translated translation kit(s) 120B. Translators 122A then return the translated translation kit(s) 120B, and the string translations in the translated translation kit(s) 120B are imported into localization database 102. Importation of the string translations from the translated translation kit(s) 120B into localization database 102 may trigger another iteration of the localization process 300, in which localization mechanism 100 may generate new versions of localized files 124A and translation kit(s) 120A. Iterations of the localization process 300 may continue until translation kit(s) 120A are empty, at which time localized files 124A are complete.

Similarly, if the translation kit(s) 120B are empty, then the localization process into language B for the product is complete. Otherwise, the translation kit(s) 120C are provided to Translator(s) 122B. Translators 122B then translate the localizable strings in the translation kit(s) 120B, and the string translations produced by the translators 122B are entered into the translation kit(s) 120B to generate translated translation kit(s) 120D. Translators 122B then return the translated translation kit(s) 120D, and the string translations in the translated translation kit(s) 120D are imported into localization database 102. Importation of the string translations from the translated translation kit(s) 120D into localization database 102 may trigger another iteration of the localization process 300, in which localization mechanism 100 may generate new versions of localized files 124B and translation kit(s) 120C. Iterations of the localization process 300 may continue until translation kit(s) 120C are empty, at which time localized files 124B are complete.

Thus, after triggering of the localization process for the two languages by the generation or modification of localization files 110 and shade files 112, a different number of iterations of the localization process 300 may be performed for each of the two languages until the localizations for the two languages are complete. Note that two languages are used as an example; the method of FIG. 3 may be applied to any number of languages.

Figure 4:
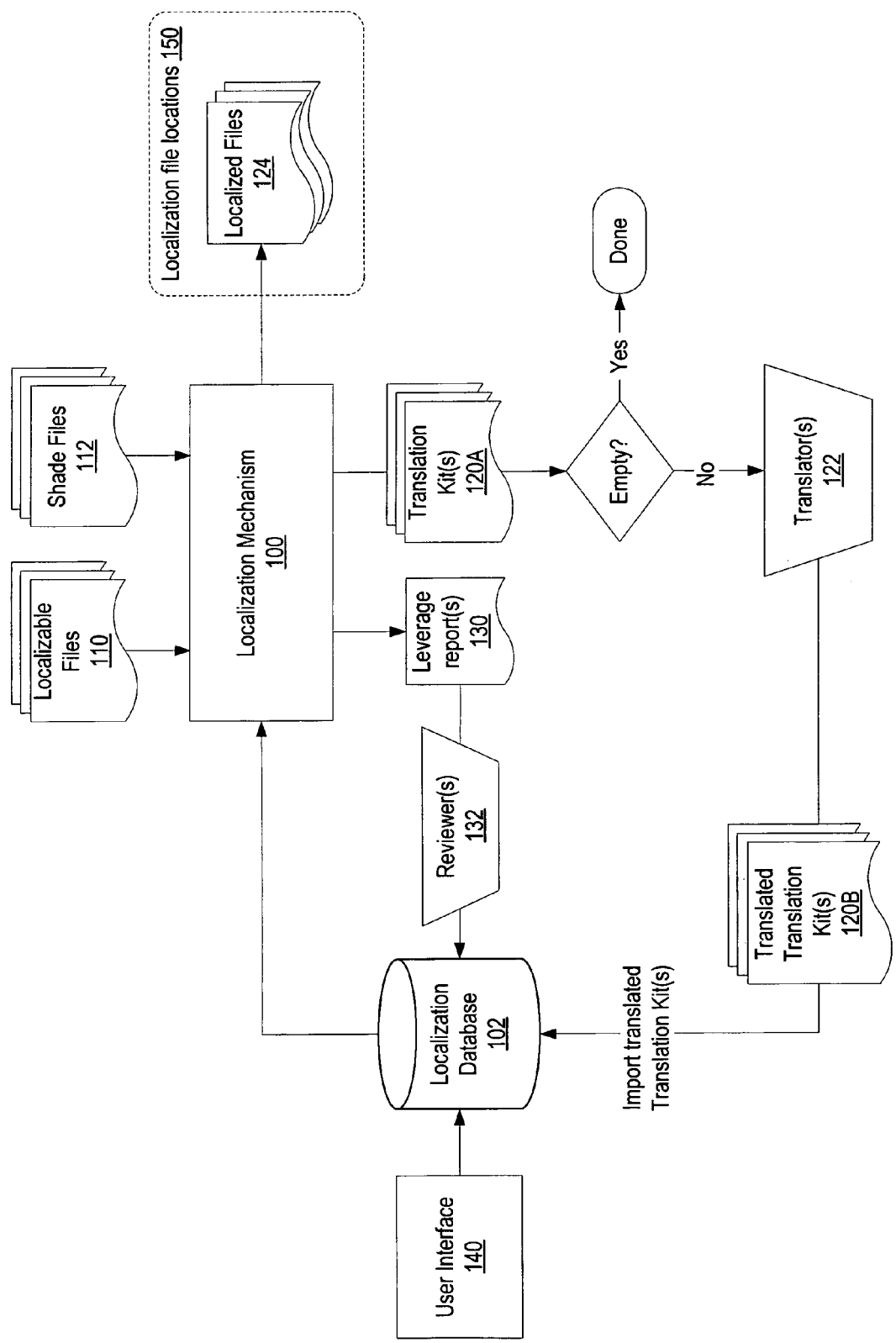
FIG. 4 illustrates a localization process according to one embodiment of the localization mechanism.

FIG. 4 illustrates a localization process according to one embodiment of the localization mechanism. Note that FIG. 4 is similar to FIG. 1, but illustrates some additional aspects of the localization process and localization mechanism according to one embodiment. Specifically, FIG. 4 shows that, in one embodiment, localization mechanism may generate one or more reports (leverage report(s) 130) for an iteration of the localization process. A leverage report 130 may include, but is not limited to, the localizable strings from localizable files 110 and the string translations from localization database 102 assigned to the localizable strings by localization mechanism 100. The leverage report(s) 130 may be reviewed by reviewer (s) 132, who are familiar with the language for which the product is being localized to identify any unsatisfactory, inappropriate, or otherwise incorrect string translations. If any such incorrect string translations are identified, the string translations may be corrected in (imported into) the localization database 102. FIG. 4 also shows a user interface 140 to localization database 102 which may be used to import the corrected string translations into localization database. Also note that user interface 140 may be used by someone with knowledge of the language(s) for which string translations are stored in localization database 102 to review the contents of localization database 102 and, if necessary, correct or modify string translations. Note that correcting one or more incorrect string translations in localization database 102, either as the result of a review of a leverage report 130 or as the result of a review of the database content itself, may trigger an iteration (or iterations) of the localization process.

Localization Database

As mentioned above, in one embodiment, the localization database may be a relational database. Note that other types of databases may be used in other embodiments. The following describes an exemplary schema for the localization database. Note that this schema is exemplary, and is not intended to be limiting. Several tables are described for the localization database. Note that embodiments may include one or more of these tables, and/or may include other tables organized according to different schema.

In one embodiment, the localization database may include one or more Translation Tables. In one embodiment, each locale (i.e., each language supported by the localization database) may have its own translation table. In an exemplary translation table, an item of translated text, such as a string translation (which may be referred to as a localization string, or simply l10n string), may be identified in the translation table by information stored in a record for the translated item. This information may include one or more of, but not limited to, product, version, property, English (as an example), and filename. Other associated information that may be stored in the record may include one or more of, but is not limited to, encoding, origin, status, creation time, last modification time, notify, and comments. The following list describes these fields. Note that one or more of these fields may be optional:

| | |
|---|---|
| product: | The name of the product that this string translation was generated for. |
| version: | The product version. |
| property: | May be one of a property name or a line/column number. |
| English: | The original English string (or string in some other original language). |
| filename: | The filename (may also include location information for the file, such as a directory). |
| encoding: | Encoding for the output. |
| origin: | If applicable, another product that this translation originated (was leveraged) from. |
| status: | Status of this translation. Possible statuses may include, but are not limited to, lock, open, unused, and deleted. |
| notify: | For example, a list of email addresses; when this record is changed, notifications will be sent out. |
| creation time: | Creation timestamp of this record |
| last modification time: | Last modification timestamp of this record |
| comments: | Additional descriptions for the translation |

In one embodiment, the localization database may include one or more History Tables. A History Table may be used to record modifications of translations. An exemplary History Table may include:
  key (product, version, property, English, filename, encoding)
  value (old_l10n_string [the original translation], new_l10n_string [the modified translation], date_time [date/time stamp of the modification], who [who modified the l10n string], comments [comments on the modification])

In one embodiment, the History Table may be queried to retrieve desired information, such as translation differences between two given times, who made changes on what translations, etc.

In one embodiment, the localization database may include one or more Translation Kit Tables. All imported translation kits may be saved in this table. The following list describes the fields of an exemplary Translation Kit table. Note that one or more of these fields may be optional:

| | |
|---|---|
| date: | Date of the generation of this translation kit entry. |
| locale: | The locale this translation kit is for. |
| product: | The name of the product that this translation kit was generated for. |
| version: | The product version. |
| Property: | Either property name or line/column number. |
| filename: | The filename (may also include location information for the file, such as a directory). |
| origin: | Translation originated from, such as JES2, inherited. |
| notify: | For example, a list of email addresses; when this record is changed, notifications will be sent out. |
| English: | The original English string (or string in some other original language). |
| status: | For example, may be one of pipeline or closed. |
| close_date: | Timestamp for importing this translation kit. |
| comments: | Anything. |

Translation Kits

As previously mentioned, translation kits may be in a canonical format, and the format may be relatively simple and thus easy for the translators to understand. Further, in one embodiment, the structure of the translation kits may be such that the translation kits may be directly imported into the localization database. In one embodiment, for each localizable string extracted from a localizable file to be translated, an entry may be added to the corresponding translation kit. In one embodiment, each entry may include one or more of, but is not limited to, the following fields:

| | |
|---|---|
| Index: | Unique index number of this entry in the translation kit. |
| Filename: | The filename of the file from which the localizable string was extracted. In one embodiment, this may also include path information to a location of the file. |
| Origin: | The origin of this entry. |
| Notify: | For example, a list of email addresses; when this record is changed, notifications will be sent out. |
| Status: | A status for this entry. |
| Comments: | Comments for this entry. |
| English: | The English string (or string in some other original language) to be translated. |

Note that, in one embodiment, a field may be included in the translation kits for entering the translated string.

Figure 5:
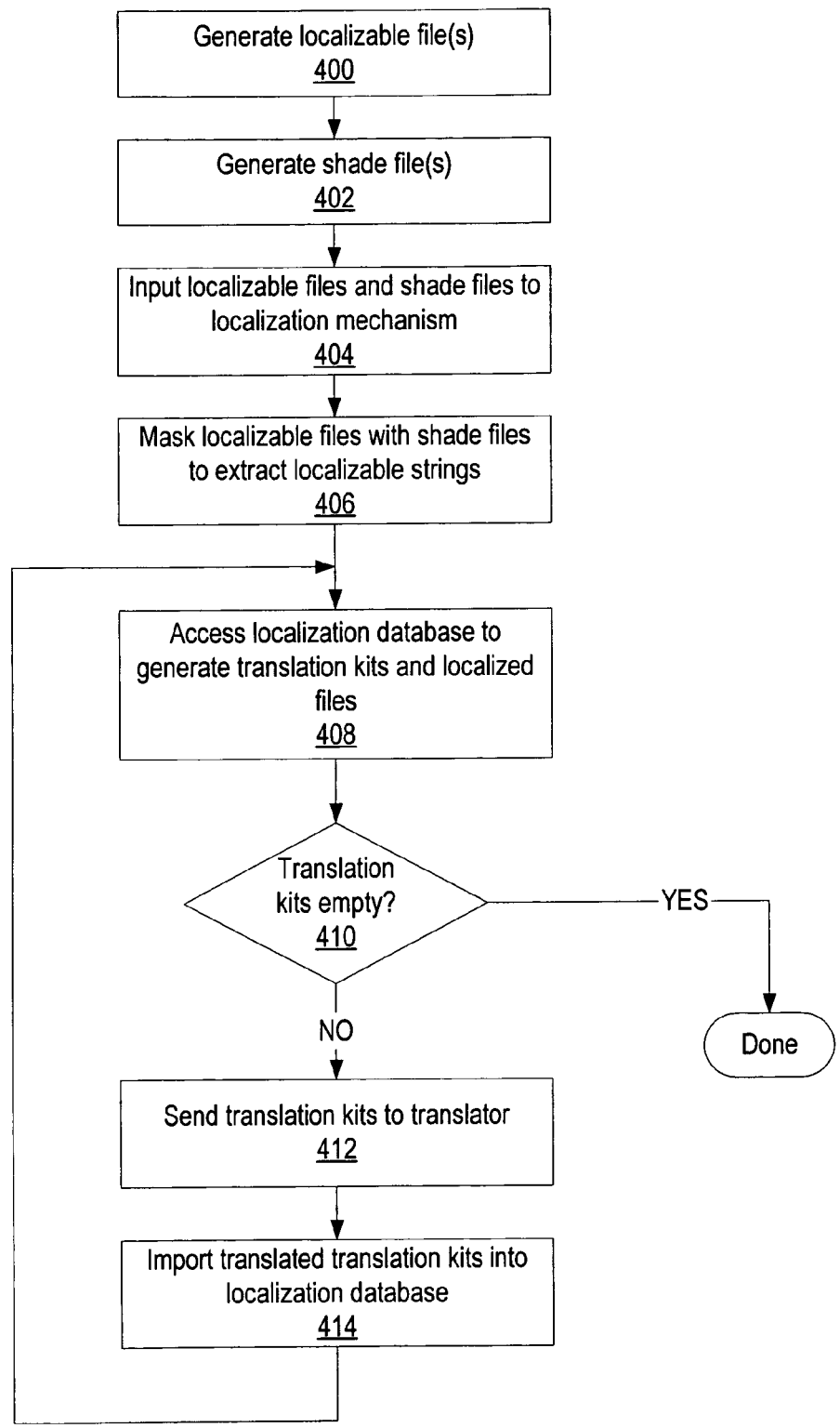
FIG. 5 is a flowchart of a localization process for a product using an embodiment of the localization mechanism.

FIG. 5 is a flowchart of a localization process for a product using an embodiment of the localization mechanism as described herein. During product development, one or more localizable files in various file formats may be generated or modified, as indicated at 400. Shade files for each of the localizable files may be generated, as indicated at 402. In one embodiment, a shade file may be generated by removing the localizable text content from the corresponding localizable file. Note that the file format/structure of the file remains intact.

As indicated at 404, the localizable files and shade files may be input to a localization mechanism, which triggers the localization process. The localization mechanism may mask the localizable files with the shade files to extract all localizable strings, as indicated at 406. Note that the shade files serve to make the localization mechanism file format-independent; the localization mechanism does not need to understand the particular file formats of the localizable files to mask out the localizable text content from the localizable files using the shade files. The localization mechanism may then access a localization database to generate translation kit(s) and localized files, as indicated at 408. In one embodiment, if a translation for a particular localizable string is located in the localization database, the translation for the string may be inserted in the proper location in a localized version of the file by the localization mechanism. If a translation for the localizable string is not located in the localization database, an entry for the localizable string may be made in a translation kit.

After all of the localizable files have been so processed to generate localized files and translation kits, the translation kit(s) may be checked, at 410, to see if the translation kit(s) are empty; that is, to see if the translation kit(s) contain any localizable strings to be translated. If the translation kit(s) are empty, then the localization process is complete. The completed localized files may then be used, without further human modification, in a build of a localized version of the product. Note that the localization mechanism may generate the localized files in a correct location to be accessed by the build process.

At 410, if the translation kit(s) are not empty, then the translation kit(s) may be sent to one or more translators for translation, as indicated at 412. Note that the translation kit(s) are generated in a relatively simple, canonical format that makes it easier for the translators to understand than conventional localization methods, which typically send the original files, in various formats, to the translators, along with translation guides. Note that embodiments, through the use of translation kit(s) as described herein, remove the requirement for generating and providing translation guides. After the translators have translated the strings in the translation kit(s), the translation kit(s) may be imported to the localization database, as indicated at 414. Another iteration of the localization process may be triggered by the importation of the translation, as indicated.

Figure 6:
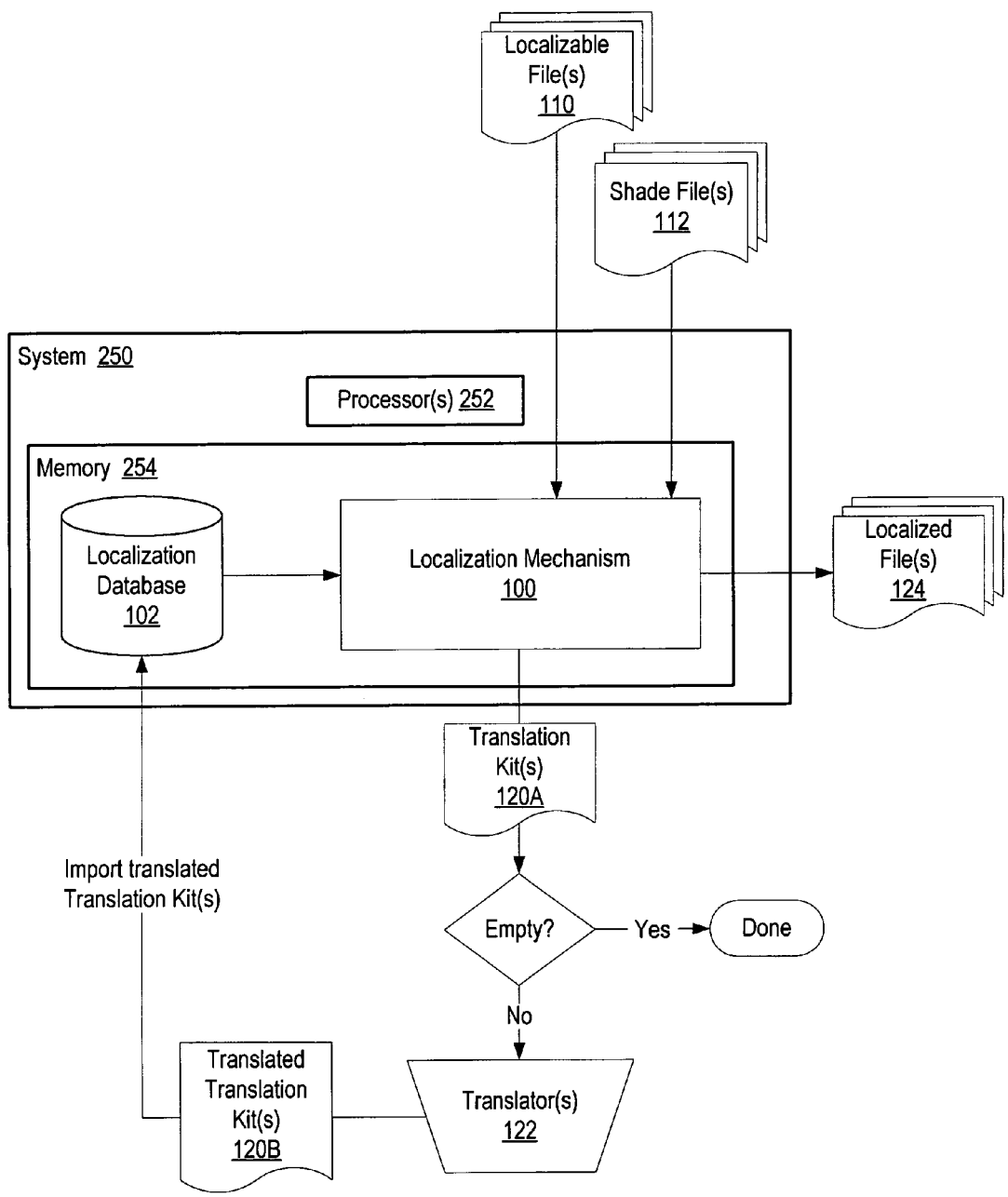
FIG. 6 illustrates a system implementing a localization mechanism according to one embodiment.

FIG. 6 illustrates a system implementing a localization mechanism according to one embodiment. System 250 may be any of various types of devices, including, but not limited to, a personal computer system, desktop computer, laptop or notebook computer, server computer, mainframe computer system, workstation, network computer, Portable Digital Assistant (PDA), smartphone, or other suitable device. System 250 may include at least one processor 252. The processor 252 may be coupled to a memory 254. Memory 254 is representative of various types of possible memory media, also referred to as "computer readable media" or "computer-accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory (storage device) such as a magnetic media, e.g., a hard drive or optical storage. The memory medium may include other types of memory as well, or combinations thereof.

System 250 may include, in memory 254, an instance of a localization mechanism 100 as described herein. Memory 254 may also include an instance of a localization database 102. Note that, while FIG. 6 shows localization database 102 as residing in memory 254 within system 250, localization database 102 may alternatively be stored on a storage device or storage system external to system 250, such as on a storage device coupled to system 250 via a network. In either case, localization database 102 may be considered as included in memory 254 of system 250.

In one embodiment, localization mechanism 100 may receive localizable files 110 and shade files 112 for a product. An iteration of a localization process may be initiated in which localization mechanism extracts the localizable text content from the localizable files 110 by masking the localizable files 110 with the shade files 112, searches localization database 102 to locate translations for the extracted localizable text content, generating translation kits 120A and localized files 124 (with correct filenames and in correct file locations). If the translation kits 120A are not empty after all the localizable text content has been processed against the localization database 102 to locate translations, the localizable strings in the translation kits 120A may then be provided to one or more translators 122 to generate translated translation kits 120B, which may then be imported into localization database 102 and applied to the localizable content on a subsequent iteration of the localization process. If the translation kits are empty after all the localizable text content has been processed against the localization database 102 to locate translations, then the localization process for the localizable files is complete.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method for localizing a software product, the method comprising:
   an automated localization mechanism implemented in a computer extracting localizable text strings, to be translated into a language for which the product is to be localized, from one or more localizable files of the software product;
   the localization mechanism searching a localization database for translations of the extracted localizable text strings, wherein the localization database comprises text strings and associated translations of the text strings in the language for which the product is to be localized;
   the localization mechanism writing translations for the localizable text strings found in the database into localized versions of the localizable files at locations from which the corresponding localizable text strings were extracted such that the localized versions match an original file structure of the localizable files; and
   the localization mechanism storing the localized versions of the localizable files in file system locations in accordance with a file organization scheme for the product, wherein the localized versions of the localizable files in the file system locations have the original file structure and are ready for a final build into a localized version of the software product such that all translations in the localized versions relative to the localizable files are obtained by the localization mechanism performing said extracting, said searching, said writing and said storing.

2. The method as recited in claim 1, further comprising:
   in said searching of the localization database for translations of the extracted localizable text strings, in response to a translation for a localizable text string not being found in the localization database, the localization mechanism generating an entry in a translation kit for the localizable text string, wherein the translation kit is formatted in accordance with a canonical translation kit format, wherein the same canonical format is used for the translation kit regardless of the format of the localizable files, and wherein the translation kit is separate from the localizable files;
   after said searching the localization database for translations of the extracted localizable text strings, in response to the translation kit including or more localizable text strings to be translated:
      providing the translation kit to a translator for translation of the localizable text strings in the translation kit, wherein translations of the localizable text strings are added to the translation kit in accordance with the canonical translation kit format; and
      importing the translations of the localizable text strings from the translation kit into the translation database in accordance with the canonical translation kit format.

3. The method as recited in claim 2, wherein the localization mechanism is operable to localize a different software product, wherein, in said localizing the different software product, the localization mechanism is operable to search the localization database including the imported translations to locate translations for the localizable text strings extracted from the localizable files of the different software product.

4. The method as recited in claim 1, further comprising:
   repeating:
      the localization mechanism searching the localization database for translations of the extracted localizable text strings;
      the localization mechanism writing translations for the localizable text strings found in the database into localized versions of the localizable files at locations from which the corresponding localizable text strings were extracted;
      in response to translations for one or more localizable text strings not being found in the localization database:
         the localization mechanism generating entries in a translation kit for the localizable text strings not found in the localization database, wherein the translation kit is formatted in accordance with a canonical translation kit format, wherein the same canonical format is used for the translation kit regardless of the format of the localizable files, and wherein the translation kit is separate from the localizable files, and wherein the translation kit is configured to be provided to a translator for translation of the localizable text strings for which entries were made in the translation kit; and providing the translation kit to a translator for translation of the localizable text strings in the translation kit; and importing translations of the localizable text strings from the translation kit into the translation database in accordance with the canonical translation kit format;

wherein said repeating is performed until the translation kit includes no entries for localizable text strings to be translated.

5. The method as recited in claim 1, wherein said extracting localizable text strings to be translated into a language for which the product is to be localized from one or more localizable files associated with the software product comprises the localization mechanism masking each localizable file with a corresponding shade file, wherein each shade file comprises content of the corresponding localizable file with the localizable text strings removed.

6. The method as recited in claim 1, wherein the localization mechanism is configured to operate on the localizable files independent of the particular file formats of the localizable files.

7. The method as recited in claim 1, further comprising:
a localized version build process for the software product accessing the localized versions of the localizable files to generate a localized version of the software product.

8. The method as recited in claim 1, wherein the localization mechanism is operable to localize the software product for each of one or more other languages.

9. The method as recited in claim 1, wherein there are two or more localizable files, and wherein different ones of the localizable files are of different file formats.

10. A system, comprising:
one or more processors;
a memory coupled to the processor and comprising a localization database comprising text strings and associated translations of the text strings in a different language, wherein the memory further comprises program instructions executable by the one or more processors to:
extract localizable text strings, to be translated into a language for which a software product is to be localized, from one or more localizable files associated with the software product;
search the localization database for translations of the extracted localizable text strings;
write translations for the localizable text strings found in the database into localized versions of the localizable files at locations from which the corresponding localizable text strings were extracted such that the localized versions match an original file structure of the localizable files; and
store the localized versions of the localizable files in file system locations in accordance with a file organization scheme for the product, wherein the localized versions of the localizable files in the file system locations have the original file structure and are ready for a final build into a localized version of the software product such that all translations in the localized versions relative to the localizable files are obtained by the program instructions performing said extracting, said searching, said writing and said storing.

11. The system as recited in claim 10, wherein the program instructions are further executable to:
in said search of the localization database for translations of the extracted localizable text strings, if a translation for a localizable text string is not found in the localization database, generate an entry in a translation kit for the localizable text string, wherein the translation kit is formatted in accordance with a canonical translation kit format, wherein the same canonical format is used for the translation kit regardless of the format of the localizable files, and wherein the translation kit is separate from the localizable files;

wherein, after said search of the localization database for translations of the extracted localizable text strings, if the translation kit includes one or more localizable text strings to be translated, the translation kit is configured to be provided to a translator for translation of the localizable text strings in the translation kit, wherein translations of the localizable text strings are added to the translation kit in accordance with the canonical translation kit format; and wherein the translations of the localizable text strings from the translation kit are configured to be imported into the translation database in accordance with the canonical translation kit format.

12. The system as recited in claim 10, wherein the program instructions are further executable to:
repeat:
search the localization database for translations of the extracted localizable text strings;
write translations for the localizable text strings found in the database into localized versions of the localizable files at locations from which the corresponding localizable text strings were extracted;
if translations for one or more localizable text strings are not found in the localization database, generate entries in a translation kit for the localizable text strings not found in the localization database, wherein the translation kit is formatted in accordance with a canonical translation kit format, wherein the same canonical format is used for the translation kit regardless of the format of the localizable files, wherein the translation kit is separate from the localizable files, and wherein the translation kit is configured to be provided to a translator for translation of the localizable text strings for which entries were made in the translation kit, and wherein translations of the localizable text strings are configured to be imported from the translation kit into the translation database in accordance with the canonical translation kit format;
until the translation kit includes no entries for localizable text strings to be translated.

13. The system as recited in claim 10, wherein, to extract localizable text strings to be translated into a language for which the product is to be localized from one or more localizable files associated with the software product, the program instructions are further executable to mask each localizable file with a corresponding shade file, wherein each shade file comprises content of the corresponding localizable file with the localizable text strings removed.

14. The system as recited in claim 10, wherein the program instructions are further configured to operate on the localizable files independent of the particular file formats of the localizable files.

15. The system as recited in claim 10, wherein the program instructions are further executable to localize the software product for each of one or more other languages.

16. A computer-accessible medium, comprising program instructions, wherein the program instructions are computer-executable to implement an automated localization mechanism configured to:

extract localizable text strings to be translated into a language for which a software product is to be localized from one or more localizable files associated with the software product;

search a localization database for translations of the extracted localizable text strings, wherein the localization database comprises text strings and associated translations of the text strings in the language for which the product is to be localized;

write translations for the localizable text strings found in the database into localized versions of the localizable files at locations from which the corresponding localizable text strings were extracted such that the localized versions match an original file structure of the localizable files; and store the localized versions of the localizable files in file system locations in accordance with a file organization scheme for the product, wherein the localized versions of the localizable files in the file system locations have the original file structure and are ready for a final build into a localized version of the software product such that all translations in the localized versions relative to the localizable files are obtained by the program instructions performing said extracting, said searching, said writing and said storing.

17. The computer-accessible medium as recited in claim 16, wherein the localization mechanism is further configured to:

in said search of the localization database for translations of the extracted localizable text strings, if a translation for a localizable text string is not found in the localization database, generate an entry in a translation kit for the localizable text string, wherein the translation kit is formatted in accordance with a canonical translation kit format, wherein the same canonical format is used for the translation kit regardless of the format of the localizable files, and wherein the translation kit is separate from the localizable files;

wherein, after said search of the localization database for translations of the extracted localizable text strings, if the translation kit includes one or more localizable text strings to be translated, the translation kit is configured to be provided to a translator for translation of the localizable text strings in the translation kit, wherein translations of the localizable text strings are added to the translation kit in accordance with the canonical translation kit format; and wherein the translations of the localizable text strings from the translation kit are configured to be imported into the translation database in accordance with the canonical translation kit format.

18. The computer-accessible medium as recited in claim 16, wherein the localization mechanism is further configured to:

repeat:
  search the localization database for translations of the extracted localizable text strings;
  write translations for the localizable text strings found in the database into localized versions of the localizable files at locations from which the corresponding localizable text strings were extracted;
  if translations for one or more localizable text strings are not found in the localization database, generate entries in a translation kit for the localizable text strings not found in the localization database, wherein the translation kit is formatted in accordance with a canonical translation kit format, wherein the same canonical format is used for the translation kit regardless of the format of the localizable files, and wherein the translation kit is separate from the localizable files, and wherein the translation kit is configured to be provided to a translator for translation of the localizable text strings for which entries were made in the translation kit, and wherein translations of the localizable text strings are configured to be imported from the translation kit into the translation database in accordance with the canonical translation kit format;
until the translation kit includes no entries for localizable text strings to be translated.

19. The computer-accessible medium as recited in claim 16, wherein, to extract localizable text strings to be translated into a language for which the product is to be localized from one or more localizable files associated with the software product, the localization mechanism is further configured to mask each localizable file with a corresponding shade file, wherein each shade file comprises content of the corresponding localizable file with the localizable text strings removed.

20. The computer-accessible medium as recited in claim 16, wherein the localization mechanism is further configured to operate on the localizable files independent of the particular file formats of the localizable files.

* * * * *

UNITED STATES PATENT AND TRADEMARK OFFICE
CERTIFICATE OF CORRECTION

PATENT NO. : 7,571,092 B1  Page 1 of 1
APPLICATION NO. : 11/193169
DATED : August 4, 2009
INVENTOR(S) : Ko-Haw Nieh It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1040 days.

Signed and Sealed this

Seventh Day of September, 2010

David J. Kappos
*Director of the United States Patent and Trademark Office*